(12) United States Patent
Kawahara et al.

(10) Patent No.: US 11,450,870 B2
(45) Date of Patent: Sep. 20, 2022

(54) FUEL CELL SYSTEM

(71) Applicants: TOYOTA JIDOSHA KABUSHIKI KAISHA, Toyota (JP); DENSO CORPORATION, Kariya (JP)

(72) Inventors: Shuya Kawahara, Toyota (JP); Shinobu Otsuka, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/326,602

(22) Filed: May 21, 2021

(65) Prior Publication Data

US 2021/0376349 A1 Dec. 2, 2021

(30) Foreign Application Priority Data

May 29, 2020 (JP) .............................. JP2020-094413

(51) Int. Cl.
*H01M 8/04664* (2016.01)
*H01M 8/04537* (2016.01)
*H01M 8/043* (2016.01)
*H01M 8/04746* (2016.01)

(52) U.S. Cl.
CPC ....... *H01M 8/04679* (2013.01); *H01M 8/043* (2016.02); *H01M 8/04559* (2013.01); *H01M 8/04753* (2013.01); *H01M 2250/20* (2013.01)

(58) Field of Classification Search
CPC ............. H01M 8/04679; H01M 8/043; H01M 8/04559; H01M 8/04753; H01M 8/04197; H01M 8/04089; H01M 8/04201; H01M 8/0488
See application file for complete search history.

(56) References Cited

U.S. PATENT DOCUMENTS

2019/0140291 A1\* 5/2019 Namba ................... H01M 8/10
2019/0267646 A1   8/2019 Yamanaka et al.

FOREIGN PATENT DOCUMENTS

| JP | H0927336 A | 1/1997 |
|---|---|---|
| JP | 2012133997 A | 7/2012 |
| JP | 2015072736 A | 4/2015 |
| JP | 2019149255 A | 9/2019 |

\* cited by examiner

*Primary Examiner* — Stewart A Fraser
(74) *Attorney, Agent, or Firm* — Dickinson Wright, PLLC

(57) ABSTRACT

A fuel cell system includes: a fuel cell in which a plurality of cells is stacked; a cathode gas supply unit that supplies a cathode gas to the fuel cell; a voltage sensor that measures the voltage of the fuel cell; and a control unit that maintains the voltage of the fuel cell within a predetermined voltage range by controlling a supply amount of the cathode gas during low-load operation in which a load is lower than in normal operation. The control unit determines that there is a cross-leakage abnormality in the fuel cell when the supply amount of the cathode gas required to maintain the voltage of the fuel cell within the predetermined voltage range exceeds a predetermined criterial threshold value during the low-load operation.

4 Claims, 10 Drawing Sheets

FUEL CELL SYSTEM

CROSS-REFERENCE TO RELATED APPLICATION

This application claims priority to Japanese Patent Application No. 2020-094413 filed on May 29, 2020, incorporated herein by reference in its entirety.

BACKGROUND

1. Technical Field

The present disclosure relates to a fuel cell system.

2. Description of Related Art

It is known that fuel cells develop an abnormality of cross leakage that is an inflow of an anode gas into a cathode gas supply passage. For example, a defect such as opening of a hole or breakage in an electrolyte membrane, a separator, etc. leads to a cross-leakage abnormality in which cross leakage between the cathode side and the anode side increases. When a cross-leakage abnormality occurs, the anode gas flows into the cathode gas supply passage and directly burns through a catalyst, which results in lower fuel efficiency or failure. There is a known technique that detects a cross-leakage abnormality when the voltage of a fuel cell changes significantly in response to a change in a cathode gas supply amount (e.g., see Japanese Unexamined Patent Application Publication No. 9-27336 (JP 9-27336 A)).

SUMMARY

The technique described in JP 9-27336 A determines that there is a cross-leakage abnormality when gradually reducing the cathode gas supply amount results in a rapid decrease in the cell voltage. Thus, determining a cross-leakage abnormality involves reducing the cell voltage. One problem with this determination of a cross-leakage abnormality based on a decrease in the cell voltage is that repeated oxidation-reduction reactions due to fluctuations in the voltage cause an increase in the particle size of the electrode catalyst and a decrease in the contact area of the catalyst, thereby deteriorating the fuel cell. Thus, the technique described in JP 9-27336 A may cause deterioration of the fuel cell, especially deterioration of the catalyst, each time determination of a cross-leakage abnormality is made. Moreover, it is difficult to accurately estimate the amount of cross leakage from the amount or the rate of a decrease in the cell voltage.

This disclosure provides a fuel cell system that can determine a cross-leakage abnormality without causing deterioration of the fuel cell.

One aspect of this disclosure provides a fuel cell system. This fuel cell system includes: a fuel cell in which a plurality of cells is stacked; a cathode gas supply unit configured to supply a cathode gas to the fuel cell; a voltage sensor configured to measure the voltage of the fuel cell; and a control unit configured to maintain the voltage of the fuel cell within a predetermined range by controlling a supply amount of the cathode gas during low-load operation in which a load is lower than in normal operation. The control unit is configured to determine that there is a cross-leakage abnormality in the fuel cell when the supply amount of the cathode gas required to maintain the voltage of the fuel cell within the predetermined range exceeds a predetermined criterial threshold value during the low-load operation.

In the fuel cell system of the above form, an upper-limit threshold value of the predetermined range may be set to be smaller than an upper-limit voltage value at which an electrolyte membrane constituting a part of each of the plurality of cells is oxidized, and a lower-limit threshold value of the predetermined range may be set to be larger than a lower-limit voltage value at which the electrolyte membrane is reduced.

In the fuel cell system of the above form, the cathode gas supply unit may be a compressor that is provided in an air supply passage connected to the fuel cell. The supply amount of the cathode gas may be calculated based on a command value for a flow rate of the cathode gas or a command value for a rotation speed of the compressor that is given by the control unit.

In the fuel cell system of the above form, the control unit may be configured to determine that there is a cross-leakage abnormality in the fuel cell when the supply amount of the cathode gas exceeds the predetermined criterial threshold value more than once during continuous low-load operation.

According to this disclosure, a fuel cell system that can determine a cross-leakage abnormality without causing deterioration of the fuel cell is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a schematic graph showing a map defining a relationship between the temperature of the fuel cell and a criterial threshold value TH_a.

DETAILED DESCRIPTION OF EMBODIMENTS

Embodiments will be described in detail below with reference to the drawings. In the following description, the same constituent elements will be denoted by the same reference signs.

First Embodiment

Figure 1:
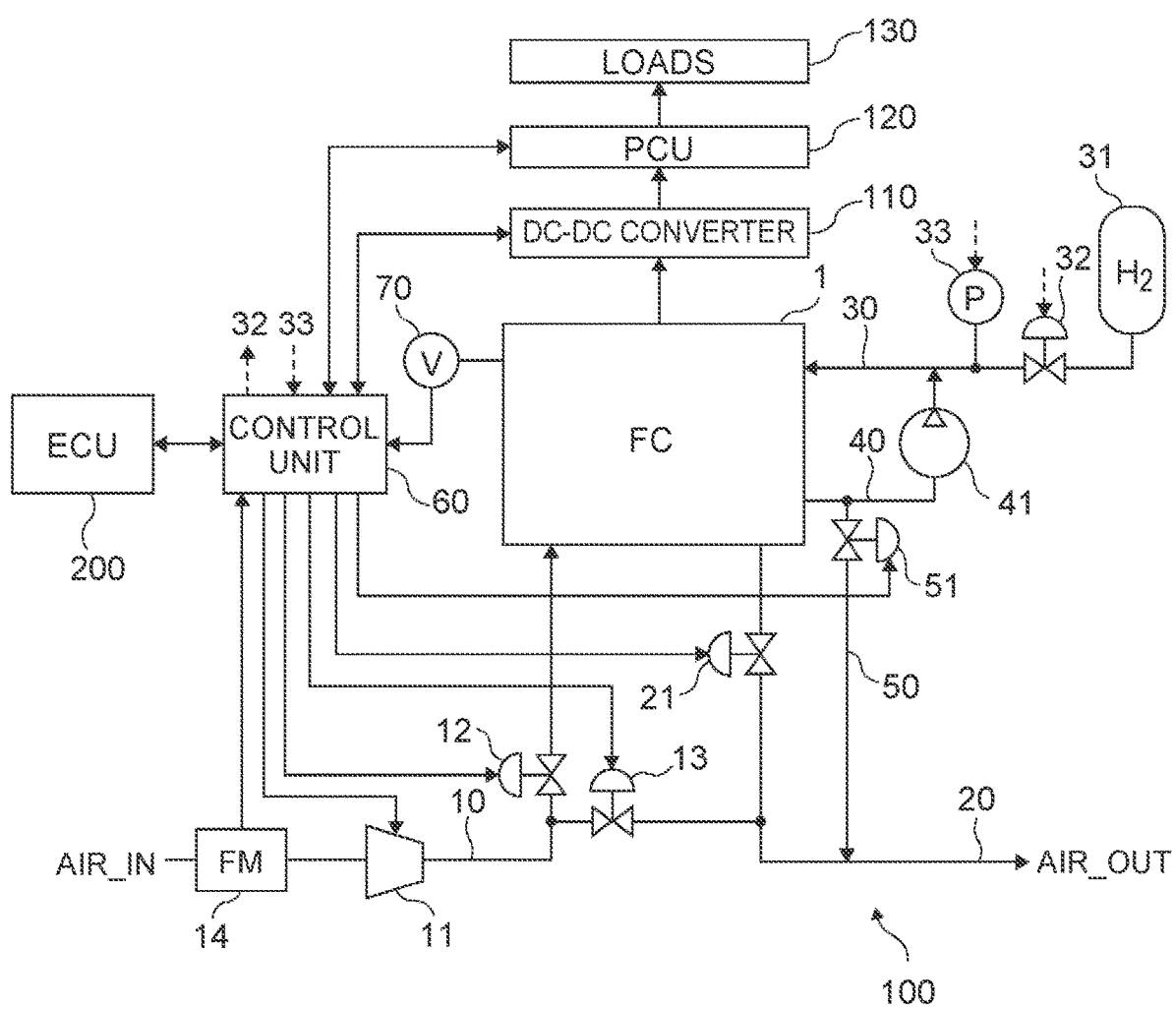
FIG. 1 is a configuration diagram of a fuel cell system according to embodiments.

First, the configuration of a fuel cell system 100 according to the embodiments will be described with reference to FIG. 1. FIG. 1 is a configuration diagram of the fuel cell system 100 according to the embodiments. As shown in FIG. 1, the fuel cell system 100 includes a fuel cell 1, an air supply passage 10, a compressor 11, an air supply valve 12, an air discharge valve 13, a flowmeter 14, an air discharge passage 20, a pressure regulating valve 21, a hydrogen supply passage 30, a hydrogen tank 31, an injector 32, a pressure sensor 33, a hydrogen circulation passage 40, a circulation pump 41, a hydrogen discharge passage 50, an exhaust valve 51, a control unit 60, and a voltage sensor 70. The fuel cell system 100 further includes a DC-DC converter 110, a PCU 120, and loads 130.

In this embodiment, the fuel cell system 100 applied to a fuel cell electric vehicle will be described as one example. The fuel cell electric vehicle travels by driving a motor with electricity generated by the fuel cell 1. However, the fuel cell system 100 is not limited to the use in fuel cell electric vehicles but can also be used for other purposes.

The fuel cell 1 is a solid polymer electrolyte fuel cell and includes a cell stack in which many single cells are stacked. Here, each single cell has a membrane-electrode assembly (MEA) composed of a polymer electrolyte membrane and an anode electrode and a cathode electrode that sandwich the polymer electrolyte membrane, and a pair of separators that sandwiches this MEA from both sides. The fuel cell 1 generates electricity by oxidation-reduction reactions between an oxygen gas in air supplied through the cathode-side separator and a hydrogen gas supplied through the anode-side separator.

Specifically, the oxidation reaction of Formula (1) occurs in the anode electrode, while the reduction reaction of Formula (2) occurs in the cathode electrode. In the fuel cell 1 as a whole, the chemical reaction of Formula (3) occurs:

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

The air supply passage 10 is a gas pipe through which air that is an oxidizing gas (cathode gas) is supplied to the fuel cell 1. The compressor 11 is provided in the air supply passage 10. The compressor 11 is one aspect of a cathode gas supply unit that supplies the cathode gas to the fuel cell 1, and compresses air taken in from the outside of the system (AIR_IN) and sends the compressed air to the fuel cell 1.

The flow rate of the air (air flow rate) introduced into the compressor 11 is measured by the flowmeter 14 provided in the air supply passage 10. The air flow rate measured by the flowmeter 14 is input into the control unit 60.

The air compressed by the compressor 11 is supplied to the fuel cell 1 through the air supply valve 12. The air compressed by the compressor 11 is discharged to the air discharge passage 20 through the air discharge valve 13. Here, the air supply valve 12 and the air discharge valve 13 can distribute the air compressed by the compressor 11 to the fuel cell 1 and the air discharge passage 20. The distribution ratio between the fuel cell 1 and the air discharge passage 20 is determined by the opening degrees of the air supply valve 12, the air discharge valve 13, and the pressure regulating valve 21 that is to be described later. The opening degrees of the air supply valve 12, the air discharge valve 13, and the pressure regulating valve 21 are controlled by the control unit 60. The air supply valve 12, the air discharge valve 13, and the pressure regulating valve 21 may constitute one aspect of the cathode gas supply unit that supplies the cathode gas to the fuel cell 1.

The air discharge passage 20 is a gas pipe through which reacted air is discharged from the fuel cell 1. The pressure regulating valve 21 is provided in the air discharge passage 20. The air pressure (cathode pressure) in the fuel cell 1 is adjusted by the pressure regulating valve 21. Air having passed through the pressure regulating valve 21 (AIR_OUT) is released to the outside of the system.

The hydrogen supply passage 30 is a gas pipe through which the hydrogen gas that is a fuel gas (anode gas) is supplied to the fuel cell 1. The hydrogen tank 31 is provided at a terminal end of the hydrogen supply passage 30. For example, a high-pressure hydrogen gas is stored in the hydrogen tank 31. The high-pressure hydrogen gas is depressurized by the injector 32 provided in the hydrogen supply passage 30 and then supplied to the fuel cell 1. The pressure of the hydrogen gas (anode gas pressure) in the fuel cell 1 is adjusted by opening and closing of the injector 32. Opening and closing of the injector 32 is controlled by the control unit 60.

The pressure sensor 33 is provided in the hydrogen supply passage 30 between the injector 32 and the fuel cell 1. The anode gas pressure in the fuel cell 1 is measured by the pressure sensor 33. The anode gas pressure measured by the pressure sensor 33 is input into the control unit 60 and used for determination of a cross-leakage abnormality in a third embodiment to be described later.

The hydrogen circulation passage 40 is a gas pipe through which the hydrogen gas discharged from the fuel cell 1 is returned to the hydrogen supply passage 30. The circulation pump 41 is provided in the hydrogen circulation passage 40. The circulation pump 41 pressurizes the hydrogen gas discharged from the fuel cell 1 and sends the pressurized hydrogen gas to the hydrogen supply passage 30.

The hydrogen discharge passage 50 is a gas pipe through which the hydrogen gas of which the concentration has decreased is discharged from the hydrogen circulation passage 40. The exhaust valve 51 is provided in the hydrogen discharge passage 50. The hydrogen discharge passage 50 is connected to the air discharge passage 20 such that the hydrogen gas discharged from the hydrogen circulation passage 40 through the exhaust valve 51 is not directly released to the outside of the system.

The DC-DC converter 110 raises the output voltage of the fuel cell 1 and supplies the raised output voltage to the PCU 120. The PCU 120 has a built-in inverter and supplies electricity to the loads 130 through the inverter in accordance with control by the control unit 60. Further, the PCU 120 limits a current to the fuel cell 1 in accordance with control by the control unit 60.

Electricity of the fuel cell 1 is supplied through a power source circuit including the PCU 120 to the loads 130 including a traction motor that drives wheels of the fuel cell electric vehicle as well as to the compressor 11, the circulation pump 41, various valves, etc.

The control unit 60 controls the operation of various pieces of equipment in the fuel cell system 100, including the compressor 11 and various valves. The control unit 60 is configured as a computer including a processor, a memory, and an interface circuit to which various pieces of equipment including the compressor 11 and parts including various sensors are connected. The control unit 60 outputs signals for controlling the pieces of equipment in the fuel cell system 100 in accordance with a command from an electronic control unit (ECU) 200.

The voltage sensor 70 that measures the cell voltage is mounted on the fuel cell 1. Here, the voltage of the fuel cell 1, i.e., the entire cell stack (FC voltage) is measured by the voltage sensor 70 as a cell voltage. Alternatively, the voltage of each single cell (single cell voltage) may be measured as the cell voltage. The FC voltage is equal to a total value of the single cell voltages. In this specification, the FC voltage, the single cell voltage, an average cell voltage (an average value of the single cell voltages), etc. will be collectively referred to as a cell voltage.

The ECU 200 is a controller that performs control of the entire fuel cell electric vehicle including the fuel cell system 100. For example, in the fuel cell electric vehicle, the ECU 200 controls the fuel cell electric vehicle by issuing an electricity output request to the control unit 60 according to the amount of depression of an accelerator pedal or a brake pedal and a plurality of input values including a vehicle speed. The ECU 200 may include the function of the control unit 60.

The control unit 60 controls the operation of various pieces of equipment in the fuel cell system 100 as the processor executes a control program stored in the memory. In particular, during low-load operation in which the load is lower than in normal operation, the control unit 60 performs intermittent operation by controlling the cathode gas supply amount based on the cell voltage measured by the voltage sensor 70, and determines a cross-leakage abnormality based on the cathode gas supply amount.

Fuel cell electric vehicles are sometimes driven in the mode of low-load operation in which the load is lower than in normal operation. Examples of cases where low-load operation is performed include when the fuel cell electric vehicle stops temporarily at an intersection, a stop sign, etc. (idling state), when it is travelling down a slope, and when it is coasting without the driver pressing the accelerator pedal. During low-load operation, the driving force of the traction motor that drives the wheels is stopped, or the driving force of the traction motor is minimized. Further, during low-load operation, auxiliaries are stopped wherever possible to increase the fuel efficiency. Therefore, the ECU 200 does not issue an electricity output request to the control unit 60 during low-load operation. Or the ECU 200 issues a request for a required minimum amount of electricity to the control unit 60 during low-load operation.

Figure 2:
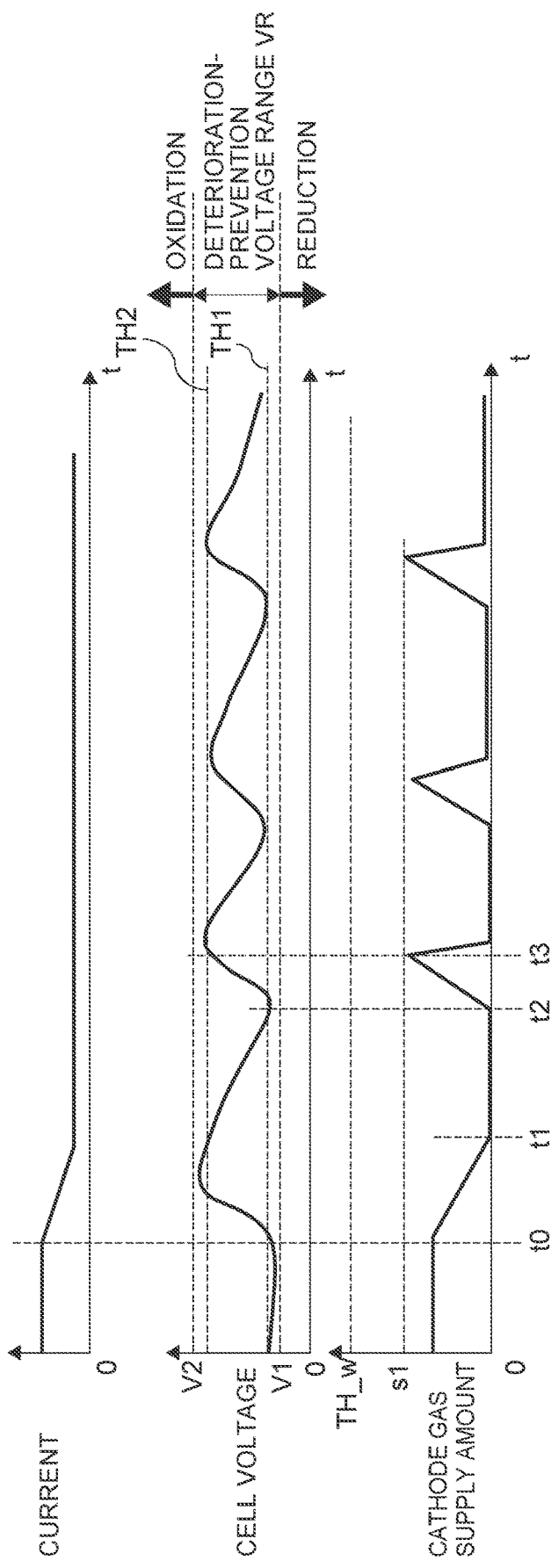
FIG. 2 is a timing chart showing changes over time in a current flowing from a fuel cell to loads, including a traction motor, a cell voltage V of the fuel cell, and a cathode gas supply amount.

When the electricity output from the fuel cell 1 is reduced during low-load operation, the current flowing from the fuel cell 1 to the loads 130 including the traction motor decreases. When the current flowing from the fuel cell 1 decreases, the cell voltage of the fuel cell 1 rises. Therefore, control to maintain the cell voltage within a predetermined range by controlling the cathode gas supply amount (intermittent operation) is performed. FIG. 2 is a timing chart illustrating intermittent operation.

FIG. 2 is a timing chart showing changes over time in the current flowing from the fuel cell 1 to the loads 130 including the traction motor, the cell voltage of the fuel cell 1, and the cathode gas supply amount. Time t0 in FIG. 2 indicates a timing at which normal operation switches to low-load operation. When normal operation switches to low-load operation, the current flowing from the fuel cell 1 to the loads 130 decreases and the voltage of the fuel cell 1 rises. Therefore, control to reduce the cell voltage by reducing the cathode gas supply amount is performed after switching to low-load operation. As a result, the cathode gas supply amount decreases as time passes, and at time t1, the supply of the cathode gas stops. More specifically, at time t1, the control unit 60 stops the supply of the cathode gas by stopping the operation of the compressor 11. Stopping the supply of the cathode gas does not have to be completely stopping the supply of the cathode gas. For example, a small amount of cathode gas may be supplied by rotating the compressor 11 at low speed. Alternatively, the supply of the cathode gas may be stopped by closing the air supply valve 12, or by controlling the distribution ratio between the fuel cell 1 and the air discharge passage 20.

Here, the electrodes deteriorate when the cell voltage of the fuel cell 1 deviates from a deterioration-prevention voltage range VR that is defined by a lower limit value V1 and an upper limit value V2 shown in FIG. 2. More specifically, when the cell voltage falls below the lower limit value V1, the polymer electrolyte membrane is reduced, whereas when the cell voltage exceeds the upper limit value V2, the polymer electrolyte membrane is oxidized. If these oxidation reaction and reduction reaction are repeated, the catalyst of the cathode electrode or the anode electrode becomes larger and the surface area of the catalyst decreases, resulting in deterioration of the fuel cell 1.

Therefore, when the cell voltage becomes lower than a threshold value TH1 at time t2 after the supply of the cathode gas is stopped, control to increase the cathode gas supply amount is performed. More specifically, at time t2, the control unit 60 increases the cathode gas supply amount by resuming the operation of the compressor 11. Alternatively, the cathode gas supply amount may be increased by opening the air supply valve 12 or controlling the distribution ratio between the fuel cell 1 and the air discharge passage 20. The threshold value TH1 is set to a value larger than the lower limit value V1. Thus, the cell voltage is kept from falling below the lower limit value V1.

When the cell voltage becomes higher than a threshold value TH2 at time t3 after the cathode gas supply amount is increased, control to reduce the cathode gas supply amount is performed. The threshold value TH2 is set to a value smaller than the upper limit value V2. Thus, the cell voltage is kept from exceeding the upper limit value V2.

In this way, during low-load operation, intermittent operation of alternately stopping and resuming the supply of the cathode gas is performed to control the cell voltage so as not to deviate from the deterioration-prevention voltage range VR and thereby mitigate the deterioration of the fuel cell 1. During intermittent operation, the anode gas is supplied so as to be superfluous (rich) relative to the cathode gas supply amount, and the cell voltage is controlled exclusively by the cathode gas supply amount.

Cross leakage between the cathode side and the anode side is correlated with the cathode gas supply amount in such a way that when the amount of cross leakage increases, the cathode gas supply amount increases. In particular, while the supply of the cathode gas is stopped in the process of intermittent operation, the anode gas moves toward the cathode side due to cross leakage, so that the oxygen concentration on the cathode side decreases and the concentration overvoltage rises. The concentration overvoltage is a voltage corresponding to energy that is additionally required due to energy loss incurred by the anode gas moving toward the cathode side. The anode gas having moved toward the cathode side hinders the supply of the cathode gas when it is resumed, and therefore the amount of cathode gas required to raise the cell voltage increases. Thus, the correlation between the cathode gas supply amount and cross leakage appears noticeably during intermittent operation.

During normal operation, on the other hand, as the cathode gas supply amount is sufficiently large compared with that during intermittent operation, cross leakage accounts for a smaller portion of the cathode gas supply amount, which makes it relatively difficult to find a correlation between the cathode gas supply amount and cross leakage.

In the first embodiment, therefore, during intermittent operation in low-load operation, a cross-leakage abnormality is determined based on the cathode gas supply amount required to maintain the cell voltage within the deterioration-prevention voltage range VR. A cross-leakage abnormality can be accurately determined when it is determined during intermittent operation in which a correlation appears between the cathode gas supply amount and cross leakage. Since a cross-leakage abnormality is determined with the cell voltage maintained within the deterioration-prevention voltage range VR, the cell voltage is unlikely to decrease excessively and deterioration of the fuel cell 1 is mitigated.

As described above, intermittent operation is performed during low-load operation in which the driving state of the fuel cell electric vehicle is an idling state, a state of traveling down a slope, a coasting state, etc., and such driving states arise frequently during driving of the fuel cell electric vehicle. Thus, determining a cross-leakage abnormality during low-load operation means determining a cross-leakage abnormality with high frequency during driving of the fuel cell electric vehicle, which allows for early detection of a cross-leakage abnormality.

Figure 3:
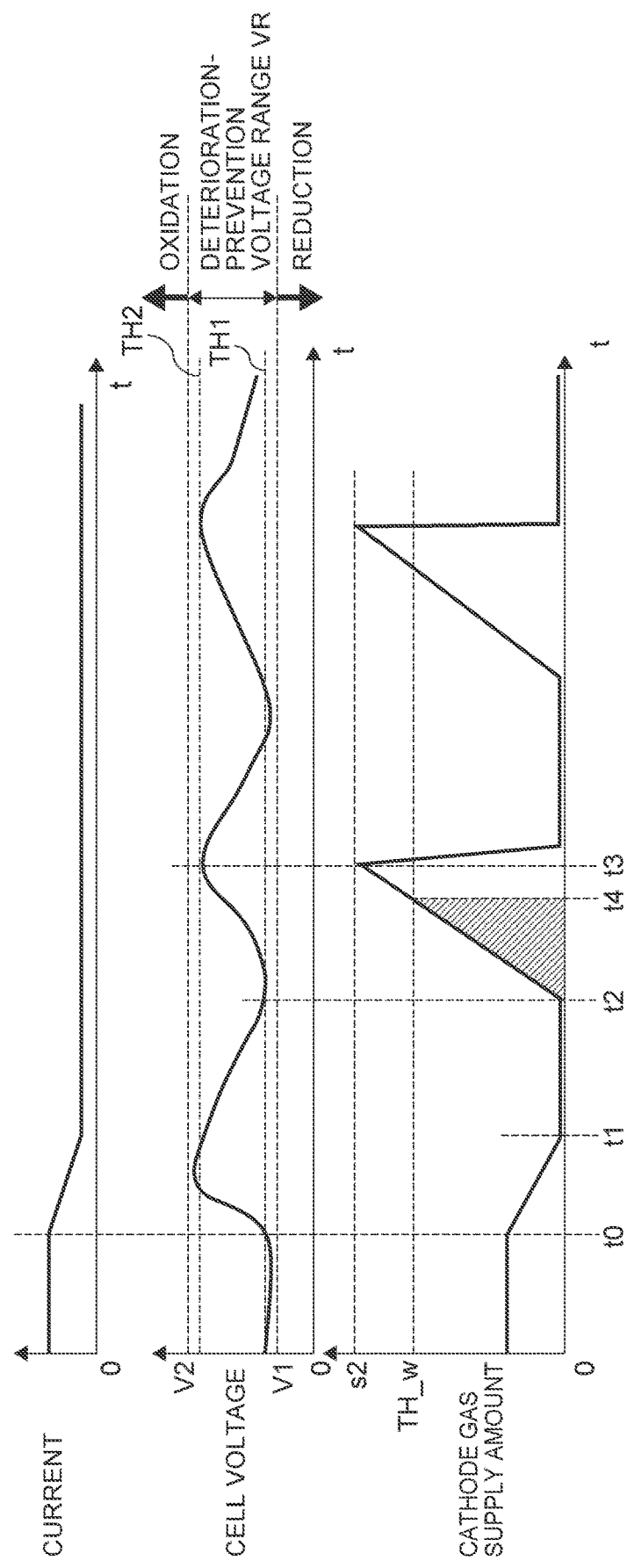
FIG. 3 is, like FIG. 2, a timing chart showing changes over time in the current, the cell voltage V, and the cathode gas supply amount, and showing a case where there is a cross-leakage abnormality.

In the following, a method of determining a cross-leakage abnormality based on the cathode gas supply amount during low-load operation according to this embodiment will be described in detail. FIG. 3 is, like FIG. 2, a timing chart showing changes over time in the current flowing from the fuel cell 1 to the loads 130, the cell voltage of the fuel cell 1, and the cathode gas supply amount, and showing a case where there is a cross-leakage abnormality.

As in FIG. 2, when normal operation switches to low-load operation at time t0, the current flowing from the fuel cell 1 to the loads 130 decreases and the voltage of the fuel cell 1 rises. Therefore, after switching to low-load operation, the control unit 60 performs control to reduce the cell voltage by reducing the cathode gas supply amount. As a result, the cathode gas supply amount decreases as time passes, and the supply of the cathode gas stops at time t1.

After the supply of the cathode gas stops, when the cell voltage becomes lower than the threshold value TH1 at time t2, the control unit 60 performs control to increase the cathode gas supply amount.

Here, if there is a cross-leakage abnormality, as described above, the anode gas having moved toward the cathode side while the supply of the cathode gas is stopped hinders the supply of the cathode gas. Therefore, after the control unit 60 increases the cathode gas supply amount, the cathode gas supply amount upon the cell voltage reaching the threshold value TH2 is larger than that when there is no cross-leakage abnormality. Specifically, as shown in FIG. 2, when there is no cross-leakage abnormality, the cathode gas supply amount upon the cell voltage reaching the threshold value TH2 is s1. On the other hand, as shown in FIG. 3, when there is a cross-leakage abnormality, the cathode gas supply amount upon the cell voltage reaching the threshold value TH2 is s2, which is larger than s1. Thus, after stopping and then resuming the supply of the cathode gas, the control unit 60 can determine a cross-leakage abnormality based on the cathode gas supply amount upon the cell voltage reaching the threshold value TH2.

In this embodiment, to determine a cross-leakage abnormality, a criterial threshold value TH_w is set for the cathode gas supply amount during intermittent operation. When the cathode gas supply amount becomes equal to or larger than the criterial threshold value TH_w during intermittent operation, the control unit 60 determines that there is a cross-leakage abnormality. In the example of FIG. 3, the cathode gas supply amount reaches the criterial threshold value TH_w at the point of time t4. Therefore, the control unit 60 determines that there is a cross-leakage abnormality at the point of time t4. The criterial threshold value TH_w is determined in advance based on, for example, an upper limit value in design to which the amount of cross leakage is desired to be reduced relatively to the cathode gas supply amount during intermittent operation.

As a specific characteristic value representing the cathode gas supply amount, the flow rate of the cathode gas (the amount of movement of the cathode gas per unit time) or the rotation speed of the compressor 11 is used. This flow rate or rotation speed is a command value from the control unit 60 or a measured value measured by a sensor. Alternatively, the characteristic value representing the cathode gas supply amount may be an integrated value of command values or measured values.

The command value is a command value for the flow rate of the cathode gas or a command value for the rotation speed of the compressor 11 given by the control unit 60. That is, the cathode gas supply amount may be calculated based on either the command value for the flow rate of the cathode gas or the command value for the rotation speed of the compressor 11 that is given by the control unit 60. When the command value is the command value for the flow rate of the cathode gas, the rotation speed of the compressor 11 and the distribution ratio between the fuel cell 1 and the air discharge passage 20 are controlled based on the command value for the flow rate of the cathode gas, and the flow rate of the cathode gas is controlled. The measured value of the flow rate of the cathode gas is a flow rate measured by the flowmeter 14, and the measured value of the rotation speed of the compressor 11 is a rotation speed measured by a rotation speed sensor (not shown). In the embodiments, as one example, the cathode gas supply amount is represented by the flow rate measured by the flowmeter 14.

The integrated value of command values or measured values is a value obtained by integrating the command value or the measured value that changes over time. For example, in FIG. 3, the integrated value of the flow rates of the cathode gas from time t2 to time t4 is represented by the area of the hatched region. A criterial threshold value for determining a cross-leakage abnormality may be individually set for each of the command value, the measured value, and the integrated value.

Determination of a cross-leakage abnormality based on a criterial threshold value may be performed by combining more than one of determination based on the command value, determination based on the measured value, and determination based on the integrated value. In one example, it is determined that there is a cross-leakage abnormality when the command value for the flow rate of the cathode gas is equal to or larger than a predetermined criterial threshold value and, moreover, the integrated value of measured values of the flow rate of the cathode gas is equal to or larger than a predetermined criterial threshold value.

Figure 4:
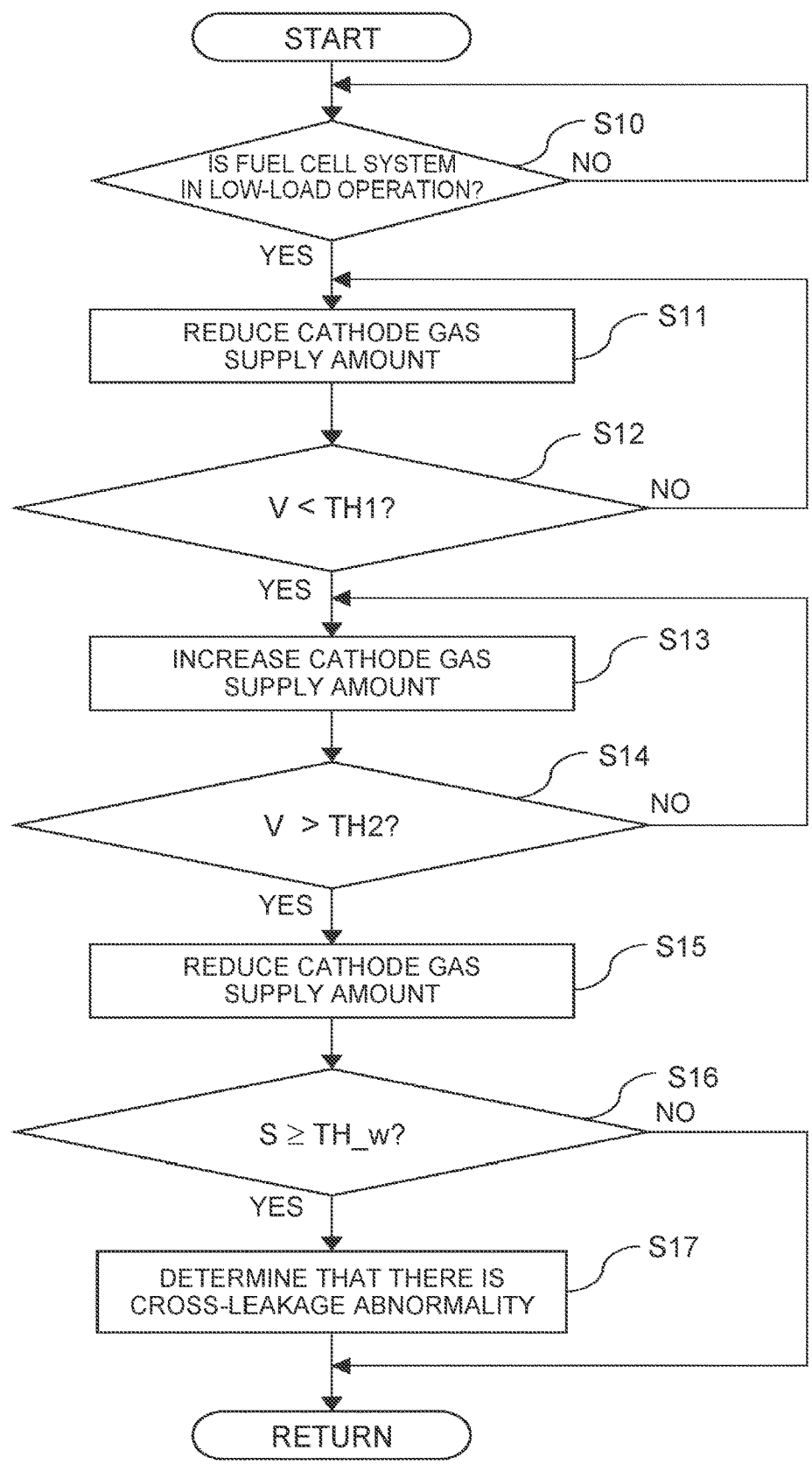
FIG. 4 is a flowchart showing the procedure of intermittent operation and cross-leakage determination in a first embodiment.

FIG. 4 is a flowchart showing the procedure of intermittent operation and determination of a cross-leakage abnormality in the first embodiment. This process is performed on a predetermined cycle by the control unit 60. First, the control unit 60 determines whether the fuel cell system 100 is in low-load operation (step S10). In step S10, the control unit 60 determines that the fuel cell system 100 is in low-load operation when the value of the electricity output request from the ECU 200 is equal to or smaller than a predetermined value. When it is determined in step S10 that the fuel cell system 100 is in low-load operation, the control unit 60 moves to step S11. When it is determined in step S10 that the fuel cell system 100 is not in low-load operation, the control unit 60 stands by in step S10.

When the fuel cell system 100 is in low-load operation, the control unit 60 reduces the cathode gas supply amount (step S11). Specifically, the control unit 60 reduces the cathode gas supply amount by stopping the operation of the compressor 11 with the air supply valve 12 open and the air discharge valve 13 closed.

Next, the control unit 60 determines whether the cell voltage V is lower than the predetermined threshold value TH1 (step S12). When the cell voltage V is lower than the threshold value TH1, the control unit 60 increases the cathode gas supply amount (step S13). Specifically, the control unit 60 increases the cathode gas supply amount by resuming the operation of the compressor 11 with the air supply valve 12 open and the air discharge valve 13 closed. When the cell voltage V is equal to or higher than the predetermined threshold value TH1, the control unit 60 returns to step S11 and continues to reduce the cathode gas supply amount.

After step S13, the control unit 60 determines whether the cell voltage V is higher than the predetermined threshold value TH2 (step S14). When the cell voltage V is higher than the threshold value TH2, the control unit 60 reduces the cathode gas supply amount (step S15). When the cell voltage V is equal to or lower than the threshold value TH2, the control unit 60 continues to increase the cathode gas supply amount (step S13).

After step S15, the control unit 60 determines whether the cathode gas supply amount S upon the cell voltage V reaching the threshold value TH2 is equal to or larger than the criterial threshold value TH_w (step S16). When the cathode gas supply amount S is equal to or larger than the criterial threshold value TH_w, the control unit 60 determines that there is a cross-leakage abnormality (step S17), and ends the process in the current control cycle. When the cathode gas supply amount S is smaller than the criterial threshold value TH_w, the control unit 60 determines that there is no cross-leakage abnormality and ends the process in the current control cycle.

In the process of FIG. 4, during low-load operation, intermittent operation is performed in which the cell voltage V is controlled to a voltage between the threshold value TH1 and the threshold value TH2 so as not to deviate from the deterioration-prevention voltage range VR. When the cathode gas supply amount S becomes equal to or larger than the criterial threshold value TH_w in the course of intermittent operation, it is determined that there is a cross-leakage abnormality.

As has been described above, in the first embodiment, it is determined that there is a cross-leakage abnormality when the cathode gas supply amount exceeds a criterial threshold value during intermittent operation in low-load operation. Since there is a correlation between the cathode gas supply amount and the amount of cross leakage, and this correlation appears noticeably during low-load operation, a cross-leakage abnormality can be accurately determined. Moreover, the cell voltage is maintained within the deterioration-prevention voltage range VR by intermittent operation in low-load operation, which can mitigate the deterioration of the fuel cell 1 due to a decrease in the cell voltage during determination of a cross-leakage abnormality.

Second Embodiment

In the second embodiment, it is determined that there is a cross-leakage abnormality when the cathode gas supply amount is detected to be equal to or larger than a criterial threshold value more than once during low-load operation in the first embodiment.

It is possible that the cathode gas supply amount may vary. Therefore, if it is determined that there is a cross-leakage abnormality based on the cathode gas supply amount being detected to be equal to or larger than the criterial threshold value once, that determination may be erroneous. For example, the measured value of the cathode gas supply amount may vary due to a detection error of the flow rate of the cathode gas by the flowmeter 14 or a detection error of the compressor rotation speed due to mechanical friction of the compressor 11 etc.

Figure 5:
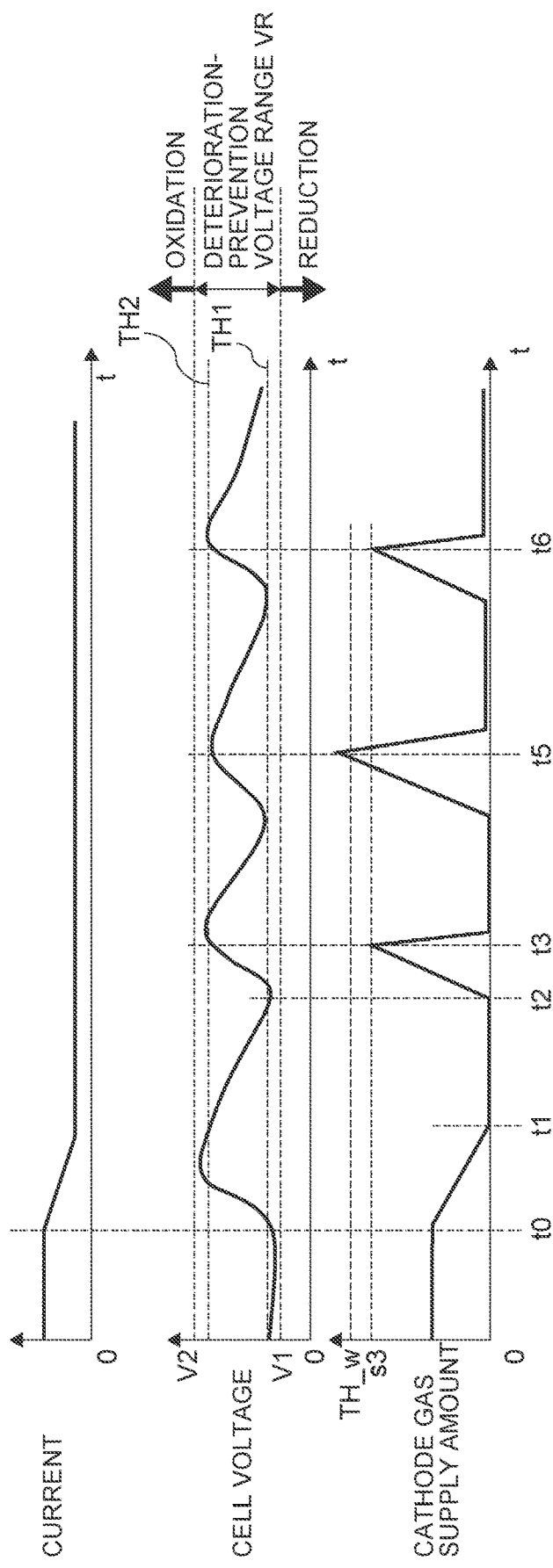
FIG. 5 is a timing chart showing a case where the cathode gas supply amount varies in the example shown in FIG. 2.

FIG. 5 is a timing chart showing a case where the cathode gas supply amount varies in the example shown in FIG. 2. In the example shown in FIG. 5, the cathode gas supply amount exceeds the criterial threshold value TH_w for a cross-leakage abnormality at time t5. On the other hand, at time t3 and time t6, a cathode gas supply amount s3 is equal to or smaller than the criterial threshold value TH_w. If it is determined at time t5 that there is a cross-leakage abnormality, that determination may be erroneous; it is possible that at time t5, the cathode gas supply amount exceeds the criterial threshold value TH_w due to variation in the cathode gas supply amount.

Such an erroneous determination can be prevented by determining a cross-leakage abnormality when the cathode gas supply amount is detected to be equal to or larger than the criterial threshold value TH_w more than once during continuous low-load operation (during the same intermittent operation period). Continuous low-load operation means low-load operation that is not interrupted by normal operation. Thus, in the case where low-load operation is interrupted by normal operation, such as when the fuel cell 1 generates electricity and applies a current to the loads 130 during low-load operation, this low-load operation is not regarded as continuous low-load operation.

Also when there is no cross-leakage abnormality, for control reasons, the cathode gas supply amount required to maintain the cell voltage within the deterioration-prevention voltage range VR can temporarily exceed the criterial threshold value TH_w during low-load operation. In this case, too, if it is determined that there is a cross-leakage abnormality based on the cathode gas supply amount being detected to be equal to or larger than the criterial threshold value TH_w once, that determination may be erroneous.

Figure 6:
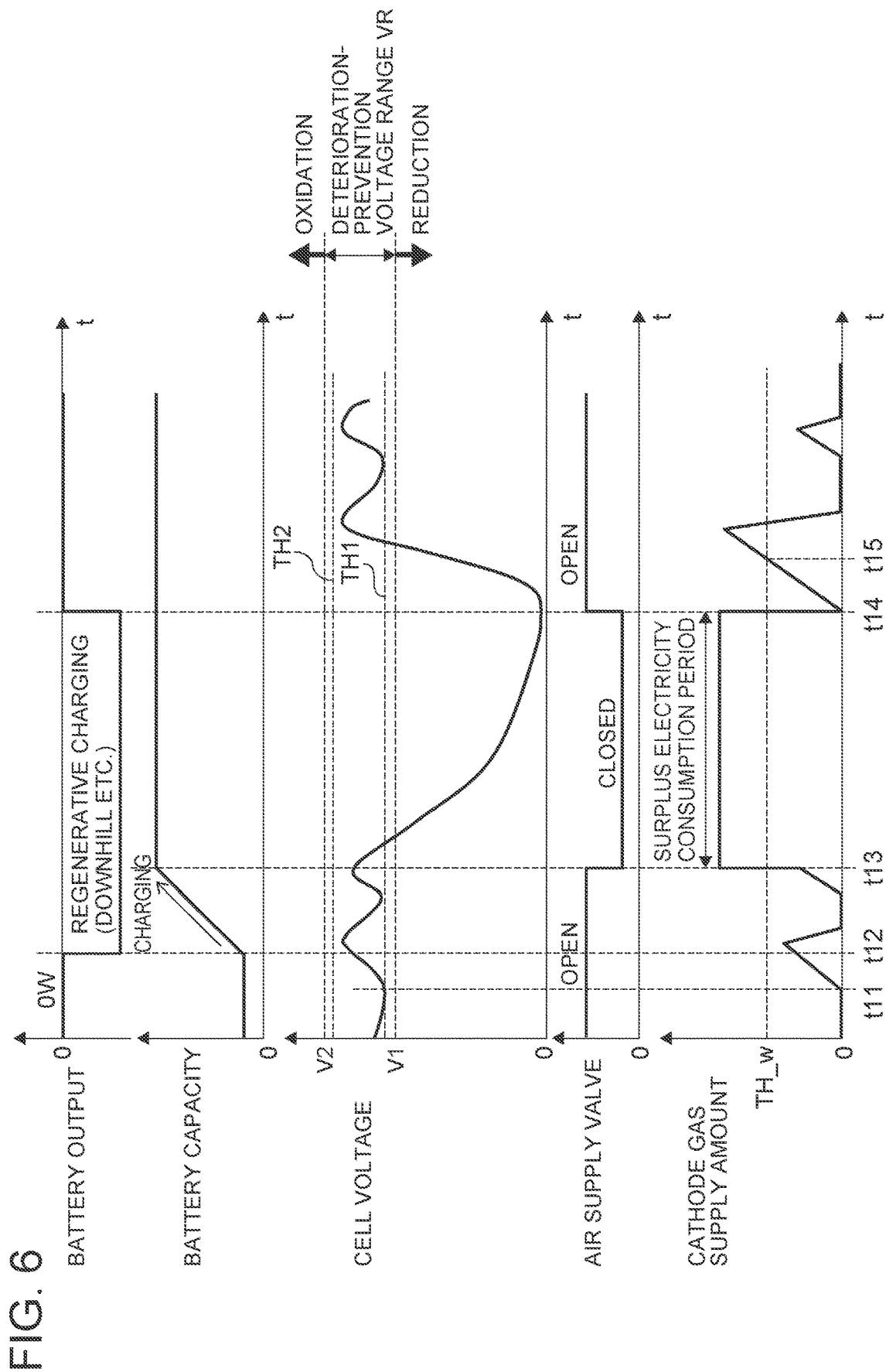
FIG. 6 is a timing chart showing, as an example in which the cathode gas supply amount during low-load operation exceeds a criterial threshold value TH_w when there is no cross-leakage abnormality, an example in which the cathode gas supply amount required to maintain the voltage within a deterioration-prevention voltage range VR increases after surplus electricity is consumed by auxiliaries.

FIG. 6 is a timing chart showing, as an example in which the cathode gas supply amount exceeds the criterial threshold value TH_w during low-load operation for control reasons, an example in which the cathode gas supply amount required to maintain the voltage within the deterioration-prevention voltage range VR increases after surplus electricity is consumed by auxiliaries. In FIG. 6, changes over time in the output of a battery, the capacity of the battery provided in the fuel cell electric vehicle, the cell voltage, the open or closed state of the air supply valve 12, and the cathode gas supply amount are shown in this order from top.

FIG. 6 shows a case where regenerative charging of the battery is performed while the fuel cell electric vehicle is traveling on a downhill etc., and the regenerative electricity is consumed as auxiliary power when the amount of electricity charged to the battery reaches an allowable amount. In FIG. 6, at the point of time t=0, the fuel cell electric vehicle is coasting without the accelerator pedal being pressed, and intermittent operation in low-load operation is already being performed. After the supply of the cathode gas is stopped, when the cell voltage becomes lower than the threshold value TH1 at time t11, control to increase the cathode gas supply amount is performed.

At time t12, the fuel cell electric vehicle enters a downhill, regenerative charging of the battery by regeneration of the traction motor is started, and a braking force of regeneration is applied to the fuel cell electric vehicle. Accordingly, the battery output that is zero until time t12 assumes a negative value when regenerative charging is started at time t12. As regenerative charging of the battery is performed, the battery capacity increases from time t12 onward.

When the battery capacity reaches a maximum chargeable value at time t13, the battery cannot be charged any more. Meanwhile, the fuel cell electric vehicle is still traveling on a downhill and electricity is generated by regeneration of the traction motor. In the period from time t13 to time t14 at which regenerative charging ends (surplus electricity consumption period), therefore, control to consume the surplus electricity generated by regeneration of the traction motor by driving auxiliaries is preferentially performed. Thus, the compressor 11 is driven at a maximum output and the surplus electricity is consumed. Meanwhile, to keep the cathode gas from being excessively supplied to the fuel cell 1, the air supply valve 12 is closed and the air discharge valve 13 is opened. In the surplus electricity consumption period, other auxiliaries than the compressor 11 are also driven to consume the surplus electricity.

In the surplus electricity consumption period, the cathode gas supply amount becomes largest as the compressor 11 is driven at the maximum output. On the other hand, since the air supply valve 12 is closed and the air discharge valve 13 is opened, the cathode gas flows from the air discharge valve 13 to the air discharge passage 20. Thus, the cathode gas is not supplied to the fuel cell 1 during the surplus electricity consumption period. Since the cathode gas is not supplied to the fuel cell 1, the cell voltage decreases as time passes, and decreases further below the lower limit value V1 of the deterioration-prevention voltage range VR. In the surplus electricity consumption period, control to consume the surplus electricity generated by regeneration is prioritized, and therefore the fall of the cell voltage below the lower limit value V1 of the deterioration-prevention voltage range VR is tolerated.

Thereafter, when travel on the downhill ends at time t14 and the fuel cell electric vehicle coasts again, intermittent operation in low-load operation is resumed. Accordingly, the air supply valve 12 is opened and the air discharge valve 13 is closed. Then, the cathode gas is supplied to the fuel cell 1 to bring the cell voltage that has decreased during the surplus electricity consumption period back to the deterioration-prevention voltage range VR. Since the cell voltage is sufficiently low immediately after resumption of intermittent operation, the cathode gas supply amount required to bring the cell voltage back to the voltage range VR is larger than that during normal intermittent operation, and exceeds the criterial threshold value TH_w at time t15. When the cell voltage is brought back to the deterioration-prevention voltage range VR, the cathode gas supply amount required to maintain the cell voltage within the voltage range VR becomes equivalent to that during normal intermittent operation.

Although intermittent operation is not performed from time t13 to time t14, the operation of FIG. 6 corresponds to continuous low-load operation because it is not interrupted by normal operation throughout the time axis. If it is determined that there is a cross-leakage abnormality based on the cathode gas supply amount exceeding the criterial threshold value TH_w once at time t15 during this continuous low-load operation, that determination is erroneous. This is because at t15, the cathode gas supply amount is increased to bring the cell voltage that has decreased during the surplus electricity consumption period back to the voltage range VR, and it is not that the cathode gas supply amount increases due to a cross-leakage abnormality.

Such an erroneous determination can be prevented by determining that there is a cross-leakage abnormality when the cathode gas supply amount is detected to be equal to or larger than the criterial threshold value TH_w more than once during continuous low-load operation. Accordingly, since the number of times that the cathode gas supply amount becomes equal to or larger than the criterial threshold value TH_w during continuous low-load operation is one in FIG. 6, it is not determined that there is a cross-leakage abnormality.

Although the cathode gas supply amount during the surplus electricity consumption period exceeds the criterial threshold value TH_w in FIG. 6, the cathode gas supplied during the surplus electricity consumption period is discharged to the air discharge passage 20 through the air discharge valve 13 and not supplied to the fuel cell 1, and therefore does not constitute a basis for determination of a cross-leakage abnormality. Thus, the cathode gas supply amount during the surplus electricity consumption period is disregarded in determination of a cross-leakage abnormality.

As in the first embodiment, during low-load operation in which the load is lower than in normal operation, the control unit 60 performs intermittent operation by controlling the cathode gas supply amount based on the cell voltage measured by the voltage sensor 70, and determines whether there is a cross-leakage abnormality based on the cathode gas supply amount during low-load operation. In this case, the control unit 60 determines that there is a cross-leakage abnormality when the cathode gas supply amount is detected to be equal to or larger than the criterial threshold value more than once during continuous low-load operation.

Figure 7:
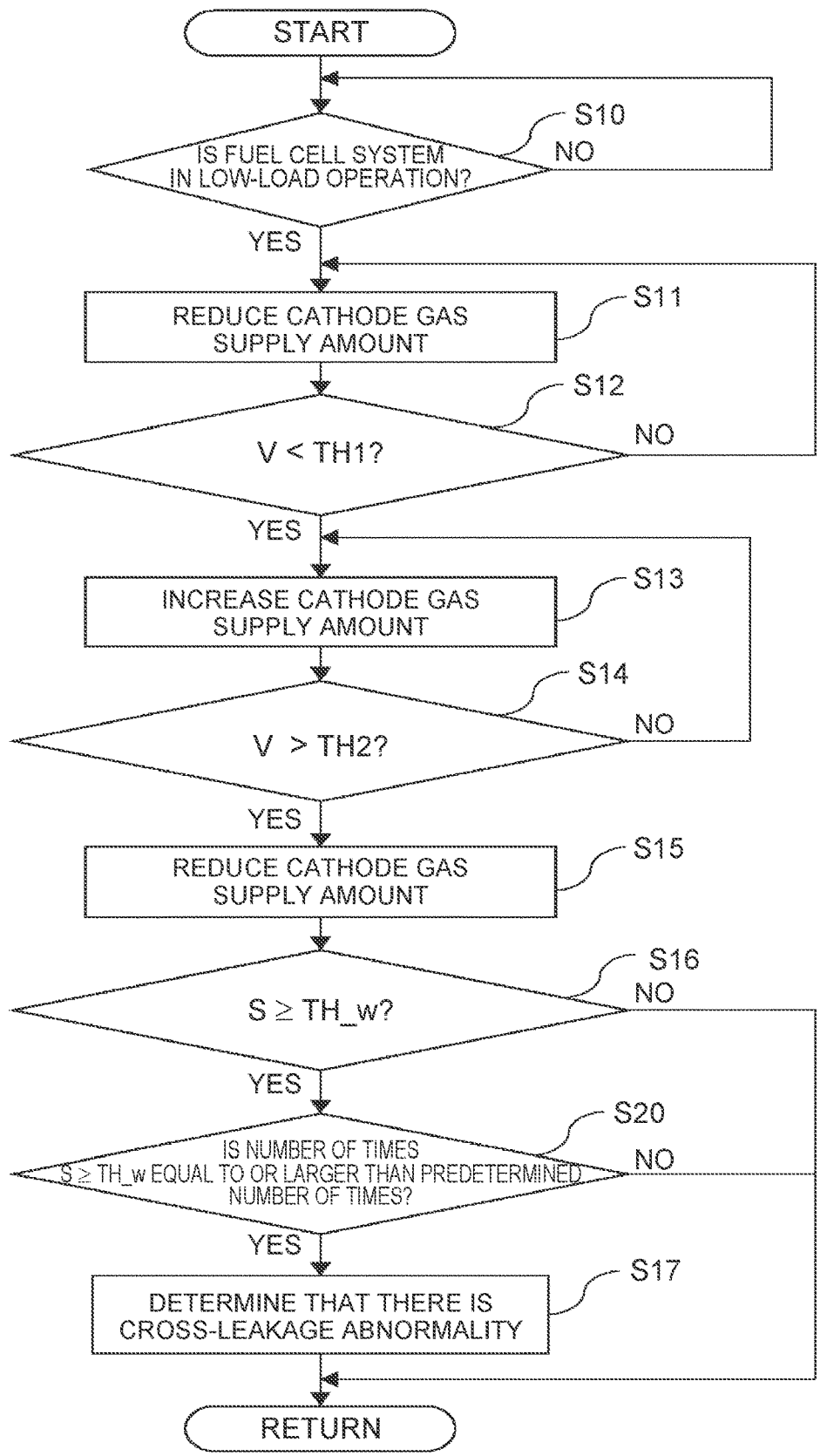
FIG. 7 is a flowchart showing the procedure of intermittent operation and cross-leakage determination in a second embodiment.

FIG. 7 is a flowchart showing the procedure of intermittent operation and determination of a cross-leakage abnormality in the second embodiment. This process is performed on a predetermined cycle by the control unit 60. Compared with the flowchart of the first embodiment shown in FIG. 4, the flowchart of FIG. 7 additionally has the process of step S20, while the other processes are basically the same as in FIG. 4. Therefore, only the process different from FIG. 4 will be described.

When the cathode gas supply amount S is equal to or larger than the criterial threshold value TH_w in step S16, the control unit 60 determines whether the number of times that the cathode gas supply amount S has become equal to or larger than the criterial threshold value TH_w is equal to or larger than a predetermined number of times during continuous low-load operation (step S20). When the number of times that the cathode gas supply amount S has become equal to or larger than the criterial threshold value TH_w is equal to or larger than the predetermined number of times during continuous low-load operation, the control unit 60 determines that there is a cross-leakage abnormality (step S17), and ends the process in the current control cycle. When the number of times that the cathode gas supply amount S has become equal to or larger than the criterial threshold value TH_w is smaller than the predetermined number of times during continuous low-load operation, the control unit 60 determines that there is no cross-leakage abnormality and ends the process in the current control cycle.

In the process of FIG. 7, it is determined that there is a cross-leakage abnormality when the number of times that the cathode gas supply amount S has become equal to or larger than the criterial threshold value TH_w is equal to or larger than the predetermined number of times during continuous low-load operation. Thus, a cross-leakage abnormality is accurately determined also when the cathode gas supply amount varies as shown in FIG. 5 or when the cathode gas supply amount increases temporarily for control reasons as shown in FIG. 6.

As has been described above, in the second embodiment, it is determined that there is a cross-leakage abnormality when the cathode gas supply amount is detected to be equal to or larger than the criterial threshold value more than once during continuous low-load operation, which increases the determination accuracy of a cross-leakage abnormality.

Third Embodiment

To shut down the operation of the fuel cell system 100, the supply of the anode gas is stopped and the exhaust valve 51 is closed. There is a known method of determining a cross-leakage abnormality based on the anode gas pressure during this operation shutdown. Since a decrease in the anode gas pressure is directly correlated with the amount of cross leakage, this method can obtain an accurate amount of cross leakage based on the anode gas pressure and thereby quantitatively determine whether there is a cross-leakage abnormality. However, this method erroneously detects a cross-leakage abnormality when there is leakage in the anode gas passage, such as when the exhaust valve 51 etc. has failed.

On the other hand, determination of a cross-leakage abnormality based on the cathode gas supply amount during low-load operation described in the first and second embodiments can determine a cross-leakage abnormality also when there is leakage in the anode gas passage.

Therefore, if determination based on the anode gas pressure during operation shutdown and determination based on the cathode gas supply amount during low-load operation are combined, an accurate amount of cross leakage can be obtained based on the anode gas pressure, as well as a cross-leakage abnormality can be determined also when the exhaust valve 51 has failed.

In determination of a cross-leakage abnormality based on the anode gas pressure, a cross-leakage abnormality is determined based on the anode gas pressure after the exhaust valve 51 is closed. The anode gas pressure changes with the temperature of the fuel cell 1 even when there is no cross-leakage abnormality. It is therefore preferable that a criterial threshold value for a cross-leakage abnormality based on the anode gas pressure be changed according to the temperature of the fuel cell 1.

Thus, in the third embodiment, determination of a cross-leakage abnormality based on the anode gas pressure during operation shutdown and determination of a cross-leakage abnormality based on the cathode gas supply amount during low-load operation are combined, and moreover, the criterial threshold value for determination based on the anode gas pressure is changed according to the temperature of the fuel cell 1. In this way, a cross-leakage abnormality can be accurately determined based on the anode gas pressure, as well as can be determined based on the cathode gas supply amount also when there is leakage in the anode gas passage.

As in the first and second embodiments, during low-load operation in which the load is lower than in normal operation, the control unit 60 performs intermittent operation by controlling the cathode gas supply amount based on the cell voltage measured by the voltage sensor 70, and determines whether there is a cross-leakage abnormality based on the cathode gas supply amount. Moreover, in the third embodiment, the control unit 60 determines whether there is a cross-leakage abnormality based on the anode gas pressure detected by the pressure sensor 33 when the operation of the fuel cell system 100 is shut down.

Determination of a cross-leakage abnormality based on the cathode gas supply amount during low-load operation is the same as in the first embodiment and the second embodiment. Therefore, the following description will focus on a technique of changing the criterial threshold value based on the temperature of the fuel cell 1 in determination of a cross-leakage abnormality based on the anode gas pressure during operation shutdown.

Figure 8:
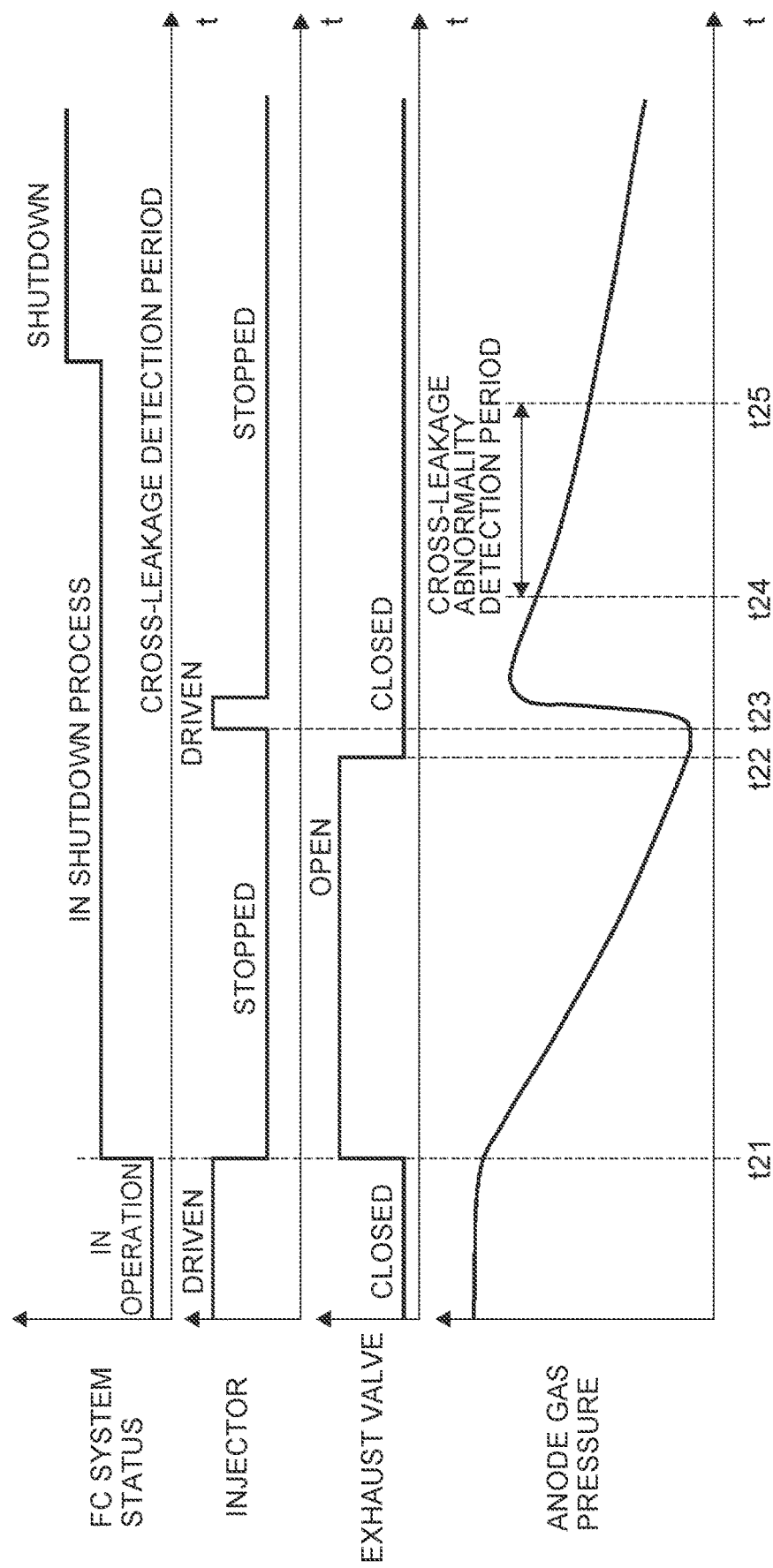
FIG. 8 is a timing chart showing changes over time in the status of the fuel cell system, a driving state of an injector, an open or closed state of an exhaust valve, and an anode gas pressure when operation of the fuel cell system is shut down.

FIG. 8 is a timing chart showing changes over time in the status of the fuel cell system 100, the driving state of the injector, the open or closed state of the exhaust valve 51, and the anode gas pressure detected by the pressure sensor 33 when the operation of the fuel cell system 100 is shut down. As shown in FIG. 8, when the status of the fuel cell system 100 switches from "in operation" to "in shutdown process" at time t21, driving of the injector 32 is stopped and the supply of the anode gas to the fuel cell 1 is stopped. The exhaust valve 51 is opened, so that the anode gas pressure decreases as time passes.

The exhaust valve 51 is closed at time t22, and the injector 32 is driven for a predetermined time from time t23. When the injector 32 is driven with the exhaust valve 51 closed, the anode gas is not discharged from the hydrogen circulation passage 40, so that the anode gas pressure rises. The supply of the cathode gas is stopped at time t21 and the cathode gas pressure becomes substantially equal to the atmospheric pressure. Thus, during shutdown of the fuel cell system 100, the anode gas pressure is kept higher than the cathode gas pressure to keep the cathode gas from entering the anode side.

After time t23, when driving of the injector 32 is stopped, the anode gas pressure decreases as time passes, at a rate according to the amount of cross leakage. The rate of the decrease in the anode gas pressure is calculated based on the anode gas pressure detected by the pressure sensor 33 during a cross-leakage abnormality detection period from time t24 to time t25.

Here, when there is a cross-leakage abnormality, the amount of cross leakage of the anode gas leaking toward the cathode side is larger, and the rate of the decrease in the anode gas pressure is higher, than when there is no cross-leakage abnormality. Therefore, the rate of the decrease in the anode gas pressure and a predetermined criterial threshold value TH_a are compared, and it is determined that there is a cross-leakage abnormality when the rate of the decrease is equal to or higher than the criterial threshold value TH_a.

Here, the amount of cross leakage is correlated with the temperature of the fuel cell 1, and a larger amount of cross leakage occurs when the temperature is higher. More specifically, the amount of cross leakage is determined by the anode gas permeability of the polymer electrolyte membrane of the fuel cell 1. The permeability of the polymer electrolyte membrane depends on the temperature and becomes higher as the temperature becomes higher.

Thus, when the temperature is higher, a larger amount of cross leakage occurs due to the higher permeability of the polymer electrolyte membrane. Therefore, setting the criterial threshold value TH_a to a constant value regardless of the temperature of the fuel cell 1 may lead to erroneous determination that there is a cross-leakage abnormality despite there being no cross-leakage abnormality.

Figure 9:
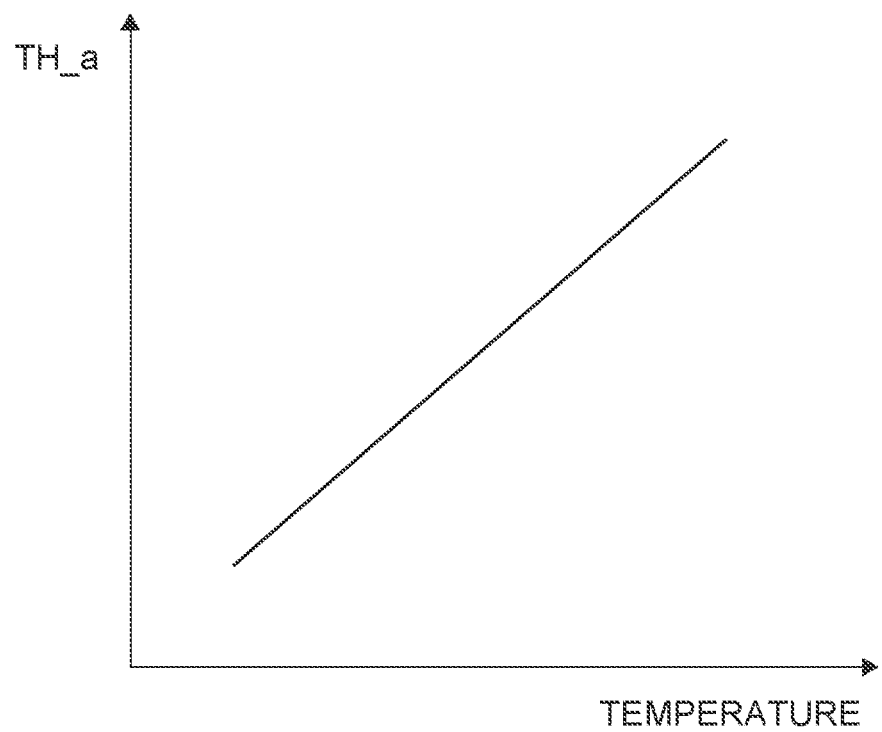

For this reason, the criterial threshold value TH_a is set according to the temperature of the fuel cell 1 so as to be larger when the temperature is higher. FIG. 9 is a schematic graph showing a map defining the relationship between the temperature of the fuel cell 1 and the criterial threshold value TH_a. As shown in FIG. 9, the criterial threshold value TH_a is set so as to be larger when the temperature of the fuel cell 1 is higher, so that a cross-leakage abnormality can be accurately determined based on the rate of the decrease in the anode gas pressure. The temperature of the fuel cell 1 is obtained by detecting the temperature of a cooling fluid that cools the fuel cell 1. Alternatively, the temperature of the fuel cell 1 may be an estimated value that is estimated from conditions such as the operating state of the fuel cell system 100.

Figure 10:
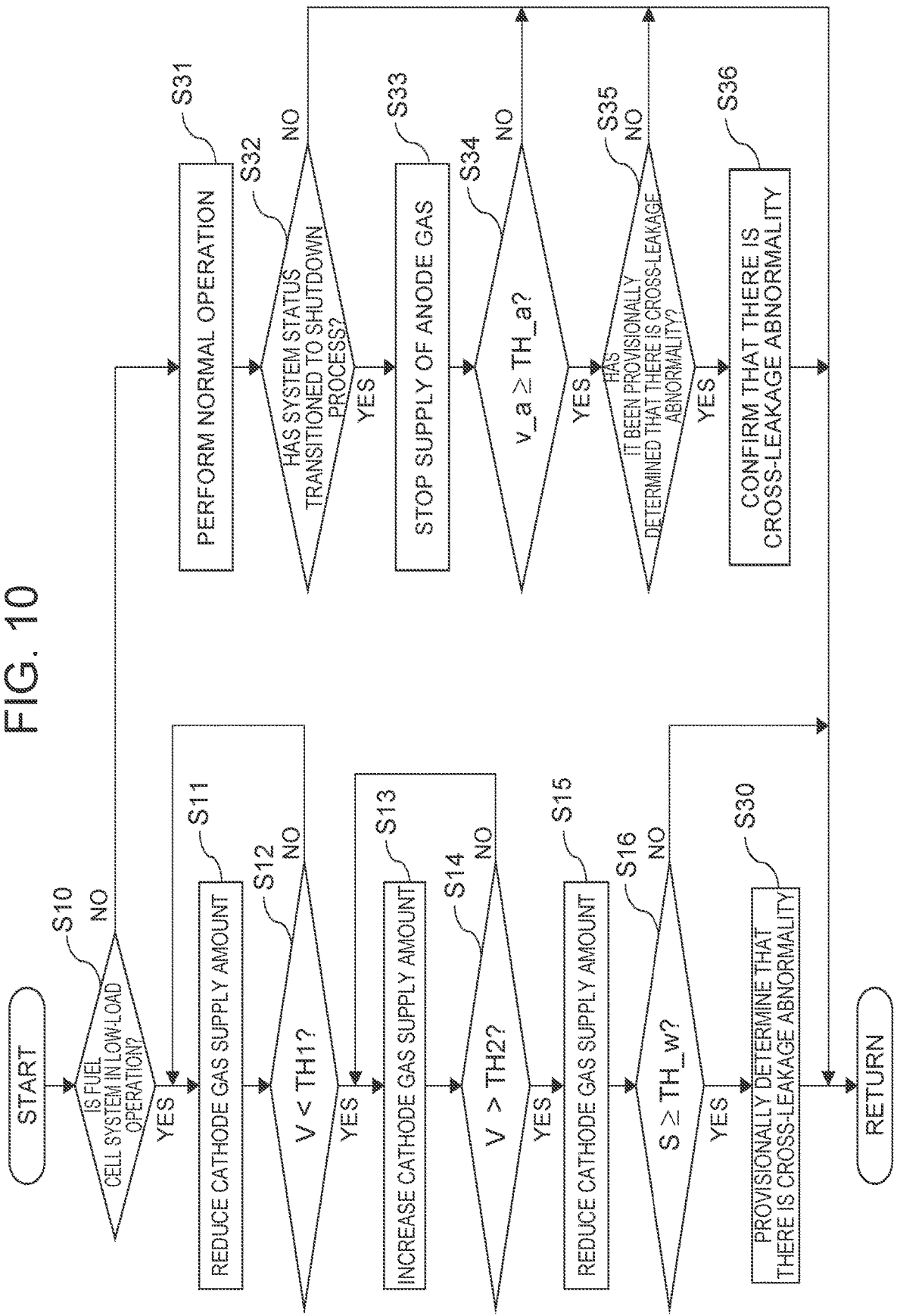
FIG. 10 is a flowchart showing the procedure of a process combining determination of a cross-leakage abnormality based on the cathode gas supply amount during low-load operation and determination of a cross-leakage abnormality based on the anode gas pressure during operation shutdown in a third embodiment.

FIG. 10 is a flowchart showing the procedure of the process that combines determination of a cross-leakage abnormality based on the anode gas pressure during operation shutdown and determination of a cross-leakage abnormality based on the cathode gas supply amount during low-load operation in the third embodiment. This process is performed on a predetermined cycle by the control unit 60. In the process of FIG. 10, a cross-leakage abnormality is determined when both of determination based on the anode gas pressure during operation shutdown and determination of a cross-leakage abnormality based on the cathode gas supply amount during low-load operation can be made.

However, a cross-leakage abnormality may be determined when either of these determinations can be made. In FIG. 10, the processes of step S10 to step S16 are the same as in FIG. 4. In the following, therefore, only those processes that are different from FIG. 4 will be described.

In the process of FIG. 4, the control unit 60 determines that there is a cross-leakage abnormality when the cathode gas supply amount S is equal to or larger than the criterial threshold value TH_w (step S17). In the process of FIG. 10, the control unit 60 provisionally determines that there is a cross-leakage abnormality when the cathode gas supply amount S is equal to or larger than the criterial threshold value TH_w (step S30). After step S30, the control unit 60 ends the process in the current control period.

When it is determined in step S10 that the fuel cell system 100 is not in low-load operation, the control unit 60 performs normal operation of supplying electricity to the loads 130 (step S31). Next, the control unit 60 determines whether the status of the fuel cell system 100 has transitioned from "in operation" to "in shutdown process" (step S32), and when the status has transitioned to "in shutdown process," the control unit 60 stops the supply of the anode gas (step S33). Then, driving of the injector 32 is stopped and the supply of the anode gas to the fuel cell 1 is stopped.

Next, the control unit 60 determines whether a rate v_a of the decrease in the anode gas pressure is equal to or higher than the criterial threshold value TH_a (step S34). Here, as the criterial threshold value TH_a, a value obtained from the map of FIG. 9 according to the temperature of the fuel cell 1 is used. When the rate v_a of the decrease in the anode gas pressure is equal to or higher than the criterial threshold value TH_a, the control unit 60 determines whether it has been provisionally determined that there is a cross-leakage abnormality in step S30 in the last or an earlier control cycle (step S35), and when it has been provisionally determined that there is a cross-leakage abnormality, the control unit 60 confirms that there is a cross-leakage abnormality (step S36).

When the status of the fuel cell system 100 has not transitioned to "in shutdown process" in step S32, and when the rate v_a of the decrease in the anode gas pressure is lower than the criterial threshold value TH_a in step S34 or when it has not been provisionally determined that there is a cross-leakage abnormality in step S35, the control unit 60 ends the process in the current control cycle.

In the process of FIG. 10, it is confirmed that there is a cross-leakage abnormality when the cathode gas supply amount S is equal to or larger than the criterial threshold value TH_w and, moreover, the rate v_a of the decrease in the anode gas pressure is equal to or higher than the criterial threshold value TH_a.

In the process of FIG. 10, it may be provisionally determined that there is a cross-leakage abnormality when the rate v_a of the decrease in the anode gas pressure is equal to or higher than the criterial threshold value TH_a, and further, it may be confirmed that there is a cross-leakage abnormality when the cathode gas supply amount S is equal to or larger than the criterial threshold value TH_w.

In the process of FIG. 10, determination of a cross-leakage abnormality based on the cathode gas supply amount may be such that it is provisionally determined that there is a cross-leakage abnormality when the cathode gas supply amount is detected to be equal to or larger than the criterial threshold value more than once during continuous low-load operation as in the second embodiment.

As has been described above, in the third embodiment, determination of a cross-leakage abnormality based on the anode gas pressure during operation shutdown and determination of a cross-leakage abnormality based on the cathode gas supply amount during low-load operation are combined, so that a cross-leakage abnormality can be determined also when there is leakage in the anode gas passage, as well as the amount of cross leakage can be quantitatively obtained based on the anode gas pressure. Moreover, since the criterial threshold value that is compared with the rate of the decrease in the anode gas pressure is changed according to the temperature of the fuel cell 1, a cross-leakage abnormality can be determined with high accuracy based on the rate of the decrease in the anode gas pressure.

What is claimed is:

1. A fuel cell system comprising:
   a fuel cell in which a plurality of cells is stacked;
   a cathode gas supply unit configured to supply a cathode gas to the fuel cell;
   a voltage sensor configured to measure a voltage of the fuel cell; and
   a control unit configured to maintain the voltage of the fuel cell within a predetermined range by controlling a supply amount of the cathode gas during low-load operation in which a load is lower than in normal operation, wherein the control unit is configured to determine that there is a cross-leakage abnormality in the fuel cell when the supply amount of the cathode gas required to maintain the voltage of the fuel cell within the predetermined range exceeds a predetermined criterial threshold value during the low-load operation.

2. The fuel cell system according to claim 1, wherein:

an upper-limit threshold value of the predetermined range is set to be smaller than an upper-limit voltage value at which an electrolyte membrane constituting a part of each of the plurality of cells is oxidized; and a lower-limit threshold value of the predetermined range is set to be larger than a lower-limit voltage value at which the electrolyte membrane is reduced.

3. The fuel cell system according to claim 1, wherein:

the cathode gas supply unit is a compressor that is provided in an air supply passage connected to the fuel cell; and the supply amount of the cathode gas is calculated based on a command value for a flow rate of the cathode gas or a command value for a rotation speed of the compressor that is given by the control unit.

4. The fuel cell system according to claim 1, wherein the control unit is configured to determine that there is a cross-leakage abnormality in the fuel cell when the supply amount of the cathode gas exceeds the predetermined criterial threshold value more than once during continuous low-load operation.

* * * * *